US012581234B2

(12) United States Patent
Furukawa et al.

(10) Patent No.: US 12,581,234 B2
(45) Date of Patent: Mar. 17, 2026

(54) HOWLING SUPPRESSION DEVICE, HOWLING SUPPRESSION METHOD, AND NON-TRANSITORY COMPUTER READABLE RECORDING MEDIUM STORING HOWLING SUPPRESSION PROGRAM

(71) Applicant: Panasonic Intellectual Property Corporation of America, Torrance, CA (US)

(72) Inventors: Hiroki Furukawa, Osaka (JP); Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 173 days.

(21) Appl. No.: 18/391,123

(22) Filed: Dec. 20, 2023

(65) Prior Publication Data

US 2024/0121554 A1 Apr. 11, 2024

Related U.S. Application Data

(63) Continuation of application No. PCT/JP2022/018597, filed on Apr. 22, 2022.

(30) Foreign Application Priority Data

Jun. 30, 2021 (JP) ................................ 2021-108505

(51) Int. Cl.
*H04R 3/02* (2006.01)
*H04R 3/04* (2006.01)

(52) U.S. Cl.
CPC ................ *H04R 3/02* (2013.01); *H04R 3/04* (2013.01)

(58) Field of Classification Search
CPC ............... H04R 3/02; G10K 11/17875; G10K 11/17879; G10K 11/17881; G10K 11/17819; G10K 2210/506
See application file for complete search history.

(56) References Cited

U.S. PATENT DOCUMENTS

2008/0273728 A1 11/2008 Klinkby et al.
2009/0196433 A1 * 8/2009 Tanaka .................... H04R 3/02 381/94.1
2018/0027125 A1 * 1/2018 Petri ........................ H04B 3/23 379/406.08

FOREIGN PATENT DOCUMENTS

JP 4186932 11/2008

OTHER PUBLICATIONS

Extended European Search Report (EESR) from European Patent Office (EPO) in European Patent Appl. No. 22 83 2584.1, dated Oct. 21, 2024.

(Continued)

*Primary Examiner* — James K Mooney
(74) *Attorney, Agent, or Firm* — GREENBLUM & BERNSTEIN, P.L.C.

(57) ABSTRACT

A howling suppressing device includes: an adaptive filter that estimates an acoustic feedback characteristic representing a characteristic of an acoustic feedback sound reaching a microphone from a speaker by defining an output signal to the speaker as a reference signal, and eliminates the acoustic feedback sound from an input signal obtained via the microphone by using the estimated acoustic feedback characteristic; an estimator that estimates, on the basis of the acoustic feedback characteristic, an acoustic feedback amplitude frequency characteristic in a frequency domain; a suppression gain calculator that calculates, from the acoustic feedback amplitude frequency characteristic, a suppression gain in the frequency domain for smoothing a frequency (Continued)

peak of the acoustic feedback amplitude frequency characteristic; and a suppressor that suppresses an output signal from the adaptive filter in the frequency domain by using the suppression gain.

9 Claims, 11 Drawing Sheets

(56) References Cited

OTHER PUBLICATIONS

Soo et al., "Multidelay Block Frequency Domain Adaptive Filter", IEEE Transactions on Acoustics, Speech, and Signal Processing, vol. 38, No. 2, Feb. 1990, pp. 373-376.
International Search Report issued in International Pat. Appl. No. PCT/JP2022/018597, dated Jun. 28, 2022, along with an English language translation thereof.

* cited by examiner

HOWLING SUPPRESSION DEVICE, HOWLING SUPPRESSION METHOD, AND NON-TRANSITORY COMPUTER READABLE RECORDING MEDIUM STORING HOWLING SUPPRESSION PROGRAM

TECHNICAL FIELD

The present disclosure relates to a technology of suppressing howling attributed to acoustic feedback from a speaker to a microphone.

BACKGROUND ART

Patent Literature 1 discloses a howling suppressing device including: an adaptive howling canceller that subtracts, from a voice signal reaching a microphone, a false signal being a signal obtained through processing of a voice signal to the speaker by a delaying part and an adaptive filter; a notch filter that performs attenuation of lowering a level of a specific frequency component of an output signal from the adaptive howling canceller; and a controller that is configured to detect a frequency characteristic of an input signal or an error signal resulting from the subtraction by the adaptive howling canceller, detect an occurrence of howling and a frequency thereof on the basis of the frequency characteristic, and set the frequency as the specific frequency component in the notch filter at the detection to cause the notch filter to perform the attenuation.

However, the conventional technology faces difficulty in stably suppressing howling, and thus needs further improvement.

CITATION LIST

Patent Literature

Patent Literature 1: Japanese Patent Publication No. 4186932

SUMMARY OF INVENTION

This disclosure has been achieved to solve the drawbacks described above, and has an object of providing a technology of stably suppressing howling.

A howling suppressing device according to the present disclosure suppresses howling attributed to acoustic feedback from a speaker provided in the same space as a microphone to the microphone when the speaker loudly produces a sound acquired by the microphone. The howling suppressing device includes: an adaptive filter that estimates an acoustic feedback characteristic representing a characteristic of an acoustic feedback sound reaching the microphone from the speaker by defining an output signal to the speaker as a reference signal, and eliminates the acoustic feedback sound from an input signal obtained via the microphone by using the estimated acoustic feedback characteristic; an estimator that estimates, on the basis of the estimated acoustic feedback characteristic, an acoustic feedback amplitude frequency characteristic in a frequency domain; a suppression gain calculator that calculates, from the estimated acoustic feedback amplitude frequency characteristic, a suppression gain in the frequency domain for smoothing a frequency peak of the acoustic feedback amplitude frequency characteristic; and a suppressor that suppresses an output signal from the adaptive filter in the frequency domain by using the calculated suppression gain.

This disclosure achieves stable suppression of howling.

DESCRIPTION OF EMBODIMENTS

Figure 1:
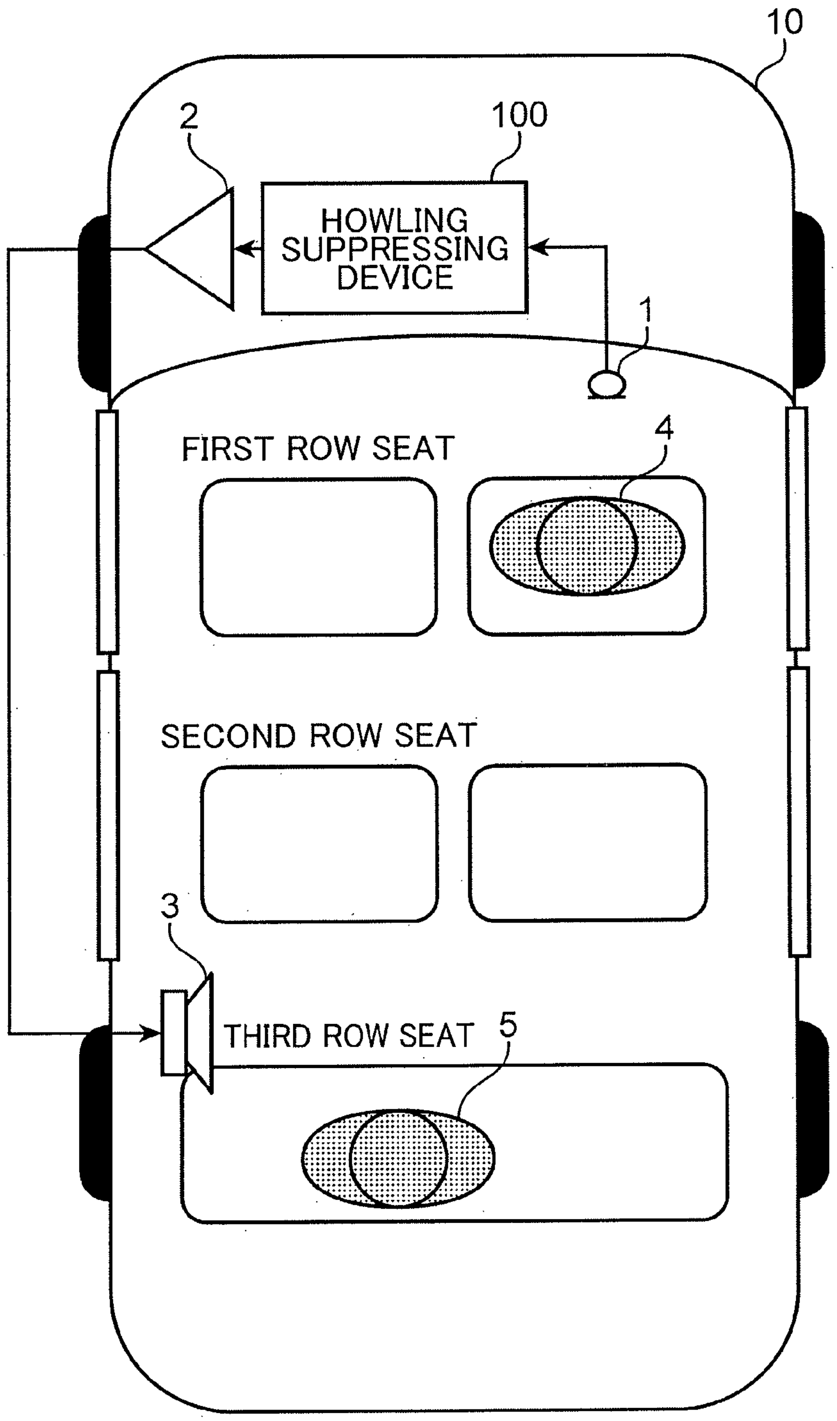
FIG. 1 is a diagram showing a configuration of a loudspeaker system in an embodiment of this disclosure.

Knowledge Forming the Basis of the Present Disclosure

Patent Literature 1 described above discloses a howling suppressing device including an adaptive filter and a notch filter in combination. However, Patent Literature 1 requires a controller to detect an occurrence of howling and a frequency thereof. The howling occurs when a gain in a loop including acoustic feedback that a sound loudly produced by a speaker comes to a microphone is greater than one. The howling may occur at a single frequency, and also may occur at a plurality of frequencies at the same time. When the howling occurs at the frequencies at the same time, it is difficult to accurately detect only the howling by distinguishing the howling from a voice or sound.

In particular, in Patent Literature 1 adopting the adaptive filter, the gain in the loop may exceed one at a plurality of frequencies at the same time in a failure of appropriate updating of a filter coefficient. In the howling suppressing device, when a voice of an utterer is input to a microphone, an acoustic feedback sound from a speaker reaches a microphone at the same time. When the acoustic feedback sound to be eliminated and the voice of the utterer irrelevant to the acoustic feedback sound reach the microphone at the same time, the adaptive filter may fail to appropriately update the filter coefficient. Consequently, howling may occur at the plurality of frequencies at the same time. Patent Literature 1 thus has drawbacks of difficulty in accurately detecting an occurrence of howling and a frequency thereof, and difficulty in reliably controlling the notch filter to stably suppress the howling.

To solve the aforementioned drawbacks, a howling suppressing device according to one aspect of the present disclosure suppresses howling attributed to acoustic feedback from a speaker provided in the same space as a microphone to the microphone when the speaker loudly produces a sound acquired by the microphone. The howling suppressing device includes: an adaptive filter that estimates an acoustic feedback characteristic representing a characteristic of an acoustic feedback sound reaching the microphone from the speaker by defining an output signal to the speaker as a reference signal, and eliminates the acoustic feedback sound from an input signal obtained via the microphone by using the estimated acoustic feedback characteristic; an estimator that estimates, on the basis of the estimated acoustic feedback characteristic, an acoustic feedback amplitude frequency characteristic in a frequency domain; a suppression gain calculator that calculates, from the estimated acoustic feedback amplitude frequency characteristic, a suppression gain in the frequency domain for smoothing a frequency peak of the acoustic feedback amplitude frequency characteristic; and a suppressor that suppresses an output signal from the adaptive filter in the frequency domain by using the calculated suppression gain.

This configuration permits the adaptive filter to eliminate an acoustic feedback sound reaching the microphone from the speaker, and the suppressor to suppress a frequency peak component of an acoustic feedback amplitude frequency characteristic, and thus achieves stable suppression of howling.

In the howling suppressing device, the adaptive filter may include a frequency domain adaptive filter that estimates an acoustic feedback characteristic in each of a plurality of divisional blocks.

According to this configuration, the frequency domain adaptive filter that estimates an acoustic feedback characteristic in each of the divisional blocks realizes a low delay rate and enables a reduction in a computation or calculation amount.

In the howling suppressing device, a coefficient update algorithm for each of the divisional blocks may include a normalized least mean square.

This configuration enables elimination of an acoustic feedback sound reaching the microphone from the speaker by using the normalized least mean square (LMS) serving as a coefficient update algorithm for each of the divisional blocks.

In the howling suppressing device, a coefficient update algorithm for each of the divisional blocks may include an independent component analysis.

This configuration enables elimination of an acoustic feedback sound reaching the microphone from the speaker by using the independent component analysis serving as a coefficient update algorithm for each of the divisional blocks.

In the howling suppressing device, the coefficient update algorithm for each of the divisional blocks may have a coefficient update gain that decreases as a delay is longer.

This configuration attains an improvement in a convergence speed of the adaptive filter owing to a decrease in the coefficient update gain of the coefficient update algorithm for each of the divisional blocks along with a longer delay.

In the howling suppressing device, the acoustic feedback characteristic may include a filter coefficient of the frequency domain adaptive filter, and the estimator may calculate a total value of a plurality of filter coefficients estimated respectively for the divisional blocks, and estimate the calculated total value as the acoustic feedback amplitude frequency characteristic.

This configuration enables estimation of a total value of a plurality of filter coefficients estimated respectively for the divisional blocks as the acoustic feedback amplitude frequency characteristic.

In the howling suppressing device, the suppression gain calculator may calculate the suppression gain by dividing an average value of acoustic feedback amplitude frequency characteristics estimated by the estimator by each acoustic feedback amplitude frequency characteristic.

This configuration enables calculation of a suppression gain in a frequency domain by dividing an average value of estimated acoustic feedback amplitude frequency characteristics by each acoustic feedback amplitude frequency characteristic.

In the howling suppressing device, the suppression gain calculator may limit a maximum value of the suppression gain.

This configuration limits the maximum value of the suppression gain, and thus achieves suppression of a frequency peak component of the acoustic feedback amplitude frequency characteristic concerning an occurrence of howling.

In the howling suppressing device, the suppression gain calculator may limit a minimum value of the suppression gain.

This configuration limits the minimum value of the suppression gain, and thus achieves suppression of a sound or voice of an utterer contained in an output signal from the adaptive filter and prevention of a sound quality deterioration.

In the howling suppressing device, the estimator may be configured to convert an acoustic feedback characteristic in a time domain estimated by the adaptive filter into the acoustic feedback characteristic in the frequency domain, and estimate the acoustic feedback amplitude frequency characteristic in the frequency domain.

This configuration permits the adaptive filter that estimates an acoustic feedback characteristic in a time domain to eliminate the acoustic feedback sound from the input signal obtained via the microphone.

Moreover, the disclosure can be realized as: a howling suppressing device including the above-described distinctive configuration; and a howling suppressing method executing distinctive ways each corresponding to the distinctive configuration of the howling suppressing device. Additionally, the disclosure can be realized by a computer program causing a computer to execute the distinctive ways included in the howling suppressing method. From these perspectives, the same advantageous effects as those of the howling suppressing device are achievable in the following other aspects.

A howling suppressing method according to another aspect of this disclosure is a howling suppressing method for a howling suppressing device that suppresses howling attributed to acoustic feedback from a speaker provided in the same space as a microphone to the microphone when the speaker loudly produces a sound acquired by the microphone. The howling method includes: causing an adaptive filter to estimate an acoustic feedback characteristic representing a characteristic of an acoustic feedback sound reaching the microphone from the speaker by defining an output signal to the speaker as a reference signal, and eliminate the acoustic feedback sound from an input signal obtained via the microphone by using the estimated acoustic feedback characteristic; causing an estimator to estimate, on the basis of the estimated acoustic feedback characteristic, an acoustic feedback amplitude frequency characteristic in a frequency domain; causing a suppression gain calculator to calculate, from the estimated acoustic feedback amplitude frequency characteristic, a suppression gain in the frequency domain for smoothing a frequency peak of the acoustic feedback amplitude frequency characteristic; and causing a suppressor to suppress an output signal from the adaptive filter in the frequency domain by using the calculated suppression gain.

A non-transitory computer readable recording medium storing a howling suppressing program according to still another aspect of this disclosure is a howling suppressing program for suppressing howling attributed to acoustic feedback from a speaker provided in the same space as a microphone to the microphone when the speaker loudly produces a sound acquired by the microphone. The howling suppressing program causes a computer to serve as: an adaptive filter that estimates an acoustic feedback characteristic representing a characteristic of an acoustic feedback sound reaching the microphone from the speaker by defining an output signal to the speaker as a reference signal, and eliminates the acoustic feedback sound from an input signal obtained via the microphone by using the estimated acoustic feedback characteristic; an estimator that estimates, on the basis of the estimated acoustic feedback characteristic, an acoustic feedback amplitude frequency characteristic in a frequency domain; a suppression gain calculator that calculates, from the estimated acoustic feedback amplitude frequency characteristic, a suppression gain in the frequency domain for smoothing a frequency peak of the acoustic feedback amplitude frequency characteristic; and a suppressor that suppresses an output signal from the adaptive filter in the frequency domain by using the calculated suppression gain.

Hereinafter, an embodiment of the disclosure will be described with reference to the accompanying drawings. It should be noted that the following embodiment illustrates one example of the disclosure, and does not delimit the technical scope of the disclosure.

Embodiment

FIG. 1 is a diagram showing a configuration of a loudspeaker system in an embodiment of this disclosure. The loudspeaker system shown in FIG. 1 is mounted in a vehicle 10.

The loudspeaker system includes a microphone 1, an amplifier 2, a speaker 3, and a howling suppressing device 100. The loudspeaker system is configured to loudly produce a sound or voice of a driver 4 on a first row seat for propagation to a passenger 5 on a third row seat.

The microphone 1 acquires a sound or voice from an utterer. The microphone 1 is provided in the vicinity of the first row seat where the driver 4 is to acquire a sound or voice uttered by the driver 4.

The speaker 3 is provided in the vicinity of the third row seat and in the same space as the microphone 1 to loudly produce the sound of the driver 4 acquired by the microphone 1. The passenger 5 on the third row seat listens to the sound of the driver 4 loudly produced by the speaker 3.

The howling suppressing device 100 suppresses howling attributed to acoustic feedback from the speaker 3 to the microphone 1.

The amplifier 2 amplifies an output from the howling suppressing device 100.

The sound of the driver 4 on the first row seat is acquired by the microphone 1, passes through the howling suppressing device 100, is amplified by the amplifier 2, is loudly produced by the speaker 3 in the vicinity of the third row seat, and is propagated to the passenger 5 on the third row seat.

Although the loudspeaker system in the embodiment includes the microphone 1 provided in the vicinity of the first row seat and the speaker 3 provided in the vicinity of the third row seat, this disclosure is not particularly limited thereto. The loudspeaker system may further include a second microphone provided in the vicinity of the third row seat to acquire a sound or voice uttered by the passenger 5, and a second speaker provided in the vicinity of the first row seat to loudly produce the sound acquired by the second microphone. In this case, the loudspeaker system may further include a second howling suppressing device that suppresses howling attributed to acoustic feedback from the second speaker to the second microphone, and a second amplifier that amplifies an output from the second howling suppressing device. The second microphone, the second speaker, the second howling suppressing device, and the second amplifier respectively have the same configurations as the microphone 1, the speaker 3, the howling suppressing device 100, and the amplifier 2.

Although the microphone 1 and the speaker 3 are arranged in the vehicle 10 in the embodiment, this disclosure is not particularly limited thereto, and the microphone and the speaker may be arranged in a chamber.

Figure 2:
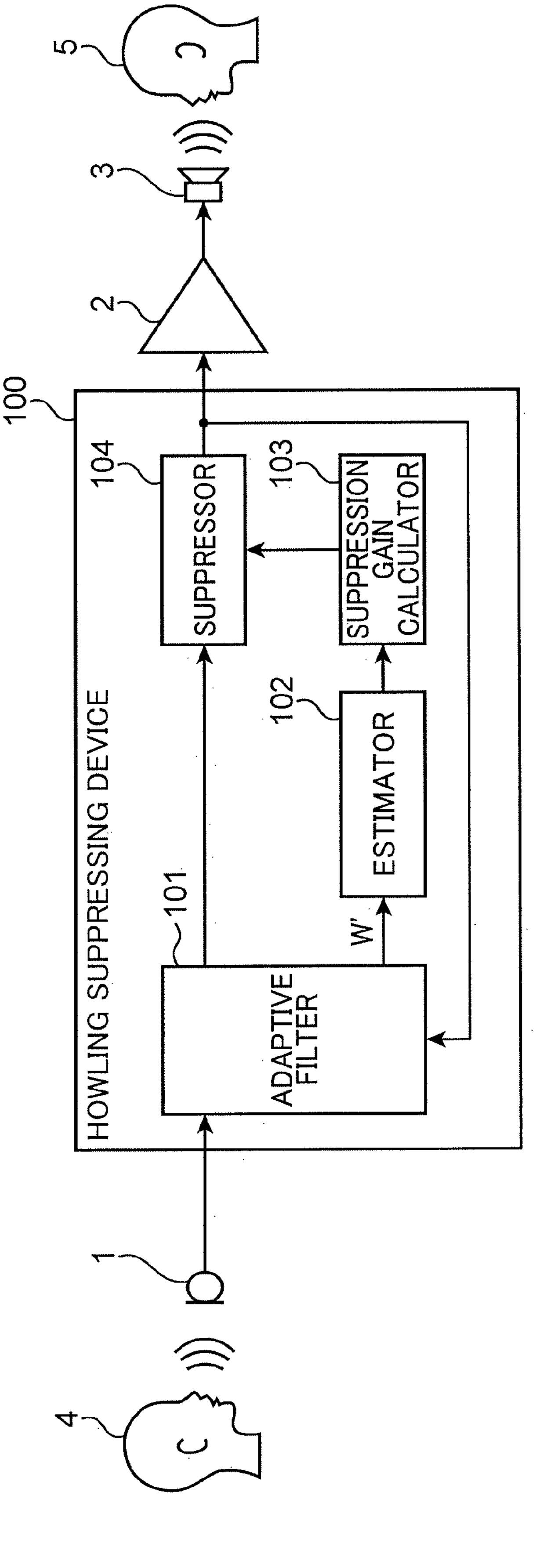
FIG. 2 is a block diagram showing a configuration of a howling suppressing device according to the embodiment.

FIG. 2 is a block diagram showing a configuration of the howling suppressing device 100 according to the embodiment.

The howling suppressing device 100 includes an adaptive filter 101, an estimator 102, a suppression gain calculator 103, and a suppressor 104.

The adaptive filter 101 estimates an acoustic feedback characteristic representing a characteristic of an acoustic feedback sound reaching the microphone 1 from the speaker 3 by defining an output signal to the speaker 3 as a reference signal. The adaptive filter 101 eliminates the acoustic feedback sound from an input signal obtained via the microphone 1 by using the estimated acoustic feedback characteristic. The adaptive filter 101 estimates a characteristic in an acoustic path from the speaker 3 to the microphone 1 by a coefficient update algorithm or adaptive algorithm, and eliminates a sound contained in the input signal from the microphone 1 and coming to the microphone 1 from the speaker 3.

The estimator 102 estimates, on the basis of the acoustic feedback characteristic estimated by the adaptive filter 101, an acoustic feedback amplitude frequency characteristic in a frequency domain.

The suppression gain calculator 103 calculates, from the acoustic feedback amplitude frequency characteristic estimated by the estimator 102, a suppression gain in the frequency domain for smoothing a frequency peak of the acoustic feedback amplitude frequency characteristic. The suppression gain calculator 103 calculates, from the acoustic feedback amplitude frequency characteristic estimated by the estimator 102, a suppression gain to suppress a peek in the acoustic feedback amplitude frequency characteristic from the speaker 3 to the microphone 1.

The suppression gain calculator 103 calculates the suppression gain by dividing an average value of acoustic feedback amplitude frequency characteristics estimated by the estimator 102 by each acoustic feedback amplitude frequency characteristic. The suppression gain calculator 103 limits a maximum value of the suppression gain, and limits a minimum value of the suppression gain. A configuration of the suppression gain calculator 103 will be described in detail later.

The suppressor 104 suppresses an output signal from the adaptive filter 101 in the frequency domain by using the suppression gain calculated by the suppression gain calculator 103. The suppressor 104 multiplies the output signal from the adaptive filter 101 by the suppression gain. A configuration of the suppressor 104 will be described in detail later.

Figure 3:
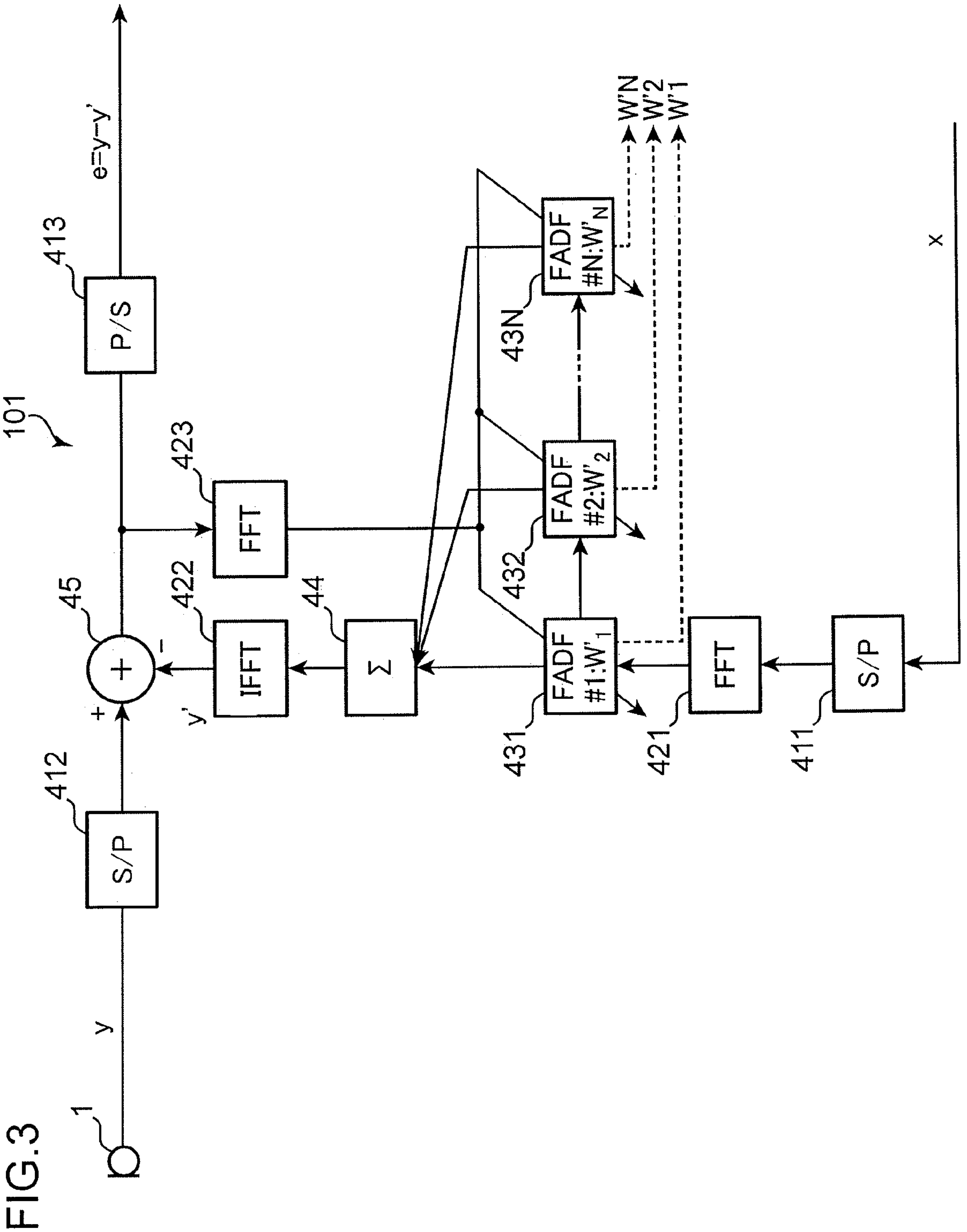
FIG. 3 is a block diagram showing a configuration of an adaptive filter in FIG. 2 in detail.

FIG. 3 is a block diagram showing a configuration of the adaptive filter 101 in FIG. 2 in detail.

The adaptive filter 101 is an MDF (Multidelay Block Frequency Domain) adaptive filter. The MDF adaptive filter is disclosed in a literature document "Multidelay Block Frequency Domain Adaptive Filter", JIA-SIEN SOO and Khee K. Pang (February 1990), IEEE Transactions on Acoustics, Speech, and Signal Processing, vol. 38, No. 2, pp. 373-376. Thus, the detailed description for the MDF adaptive filter is omitted.

The adaptive filter 101 includes: serial/parallel (S/P) converters 411, 412; a parallel/serial (P/S) converter 413; fast Fourier transform (FFT) parts 421, 423; an inverse fast Fourier transform (IFFT) part 422; first to $N^{-th}$ frequency domain adaptive filters 431 to 43N; a total sum calculator 44; and an error calculator 45.

The serial/parallel converters 411, 412 convert serial data into parallel data. The serial/parallel converter 411 converts a serial output signal from the suppressor 104 to the speaker 3 into a parallel output signal. The serial/parallel converter 412 converts a serial input signal obtained via the microphone 1 into a parallel input signal.

The parallel/serial converter 413 converts parallel data into serial data. The parallel/serial converter 413 convers a parallel output signal from the adaptive filter 101 to the suppressor 104 into a serial output signal.

Each of the fast Fourier transform parts 421, 423 performs discrete Fourier transform at a high speed. The fast Fourier transform part 421 converts an output signal in a time domain from the serial/parallel converter 411 to each of the first to $N^{-th}$ frequency domain adaptive filters 431 to 43N into an output signal in the frequency domain. The fast Fourier transform part 423 converts an error signal in the time domain from the error calculator 45 into an error signal in the frequency domain.

The inverse fast Fourier transform part 422 performs inverse discrete Fourier transform at a high speed. The inverse fast Fourier transform part 422 converts a false signal in the frequency domain simulating a sound signal in feedback from the speaker 3 to the microphone 1 into a false signal in the time domain, the sound signal being output from the total sum calculator 44 to the error calculator 45.

Each of the first to $N^{-th}$ frequency domain adaptive filters 431 to 43N generates, from a reference signal in each of the blocks obtained by sequentially delaying each signal converted into the corresponding signal in the frequency domain by the FFT 421, a false signal indicating a component of the acoustic feedback sound contained in the input signal obtained via the microphone 1. The reference signal indicates, for example, an output signal to the speaker 3. Each of the first to $N^{-th}$ frequency domain adaptive filters 431 to 43N estimates an acoustic feedback characteristic in each of the divisional blocks. The acoustic feedback characteristic includes a filter coefficient. Each of the first to $N^{-th}$ frequency domain adaptive filters 431 to 43N convolves the filter coefficient generated for each of the divisional blocks and the reference signal delayed for each of the divisional blocks in the frequency domain to generate the false signal indicating the component of the acoustic feedback sound contained in the input signal.

The total sum calculator 44 calculates a total sum of false signals respectively for the divisional blocks generated by the first to $N^{-th}$ frequency domain adaptive filters 431 to 43N.

The error calculator 45 calculates an error signal of a difference between an input signal obtained via the microphone 1 and each false signal from the total sum calculator 44, and outputs the calculated error signal to each of the first to $N^{-th}$ frequency domain adaptive filters 431 to 43N. Each of the first to $N^{-th}$ frequency domain adaptive filters 431 to 43N updates the filter coefficient on the basis of the error signal input thereto, and convolves the updated filter coefficient and the reference signal to generate a false signal. Each of the first to $N^{-th}$ frequency domain adaptive filters 431 to 43N updates the filter coefficient so that the error signal has a minimum value by using a coefficient update algorithm or adaptive algorithm. Adoptable examples of the coefficient update algorithm include the normalized least mean square (LMS).

The error calculator 45 subtracts, from an input signal obtained via the microphone 1, a false signal from the total sum calculator 44 to eliminate an acoustic feedback sound from the input signal. Hence, the error calculator 45 outputs the input signal excluding the acoustic feedback sound to the suppressor 104.

An adaptive filter adapted to an acoustic feedback characteristic reaching a microphone from a speaker generally has a continuous delay time of several 10 ms to several 100 ms for an estimative acoustic feedback characteristic. A filter coefficient suitable for the continuous delay time is needed, which leads to a larger computation or calculation amount. In the loudspeaker system, utterance is performed in the same space as the loud sound production. Under the circumstances, when a sound of an utterer is directly heard by a loud sound target person, the howling suppressing device desirably avoids a time difference between the sound of the utterer and a loudly produced sound. A large time difference between the sound of the utterer and the loudly produced sound causes a problem that the loud sound target person may hear the sound of the utterer and the loudly produced sound separately and face serious difficulty in hearing, resulting in a clarity reduction.

The howling suppressing device thus practically needs to execute howling suppression at a low delay rate while suppressing the computation amount. The MDF adaptive filter includes the first to $N^{-th}$ frequency domain adaptive filters 431 to 43N respectively for the divisional blocks as shown in FIG. 3, and thus can have a smaller computation amount than an adaptive filter in a time domain. The fast Fourier transform parts 421, 423 convert data in the time region into data in the frequency domain at a relatively small sample number, and the inverse fast Fourier transform part 422 convers data in the frequency domain into data in the time domain at a relatively small sample number. Accordingly, the MDF adaptive filter can shorten the process delay. For instance, when a sampling frequency indicates 16 kHz and the FFT sample number indicates 128, the FFT and the IFFT are executed every sixty four samples, and the process delay results in 64/16 kHz=4 ms, that is, a low delay rate is achievable.

The MDF adaptive filter permits each of the first to $N^{-th}$ frequency domain adaptive filters 431 to 43N therein to estimate an acoustic feedback characteristic from the speaker 3 to the microphone 1 in the frequency domain in each of the divisional blocks. In the case of N-divisional blocks, the estimator 102 can easily compute or calculate acoustic feedback amplitude frequency characteristics ΣW' from filter coefficients W'1, . . . , and W'N for the N-divisional blocks. Each filter coefficient W'* (the sign "*" denotes 1, . . . , N) has the same frequency component as the FFT point number, and the characteristic ΣW' indicates the acoustic feedback amplitude frequency characteristic per frequency component. The estimator 102 calculates a total value ΣW' of absolute values of filter coefficients W' estimated respectively for the divisional blocks, and estimates the calculated total value ΣW' as the acoustic feedback amplitude frequency characteristic. For instance, the estimator 102 calculates the acoustic feedback amplitude frequency characteristic by using Equation (1) shown below.

$$\Sigma W'(i)=|W'1(i)|+|W'2(i)|+\ldots+|W'N(i)| \quad (1)$$

In Equation (1), the sign "i" denotes the number of frequency components (i=0, 1, 2, . . . , FFT point −1), and the sign "|*|" denotes an absolute value of a complex number *.

For instance, the number of divisional blocks results in twelve (=0.048*16,000/64), when the sampling frequency indicates 16 KHz, the FFT point number indicates 128, and an equivalent delay of the adaptive filter indicates 48 ms. The sampling frequency number is determined by a sound or voice bandwidth. The FFT point number determines a length of a delay of the entire process. When the equivalent delay of the adaptive filter is long, the long delay is deleted, but a computation amount increases. From this perspective, the equivalent delay is determined by the computation amount and a level of sound or voice (e.g., 30 dB) to be eliminated.

Figure 4:
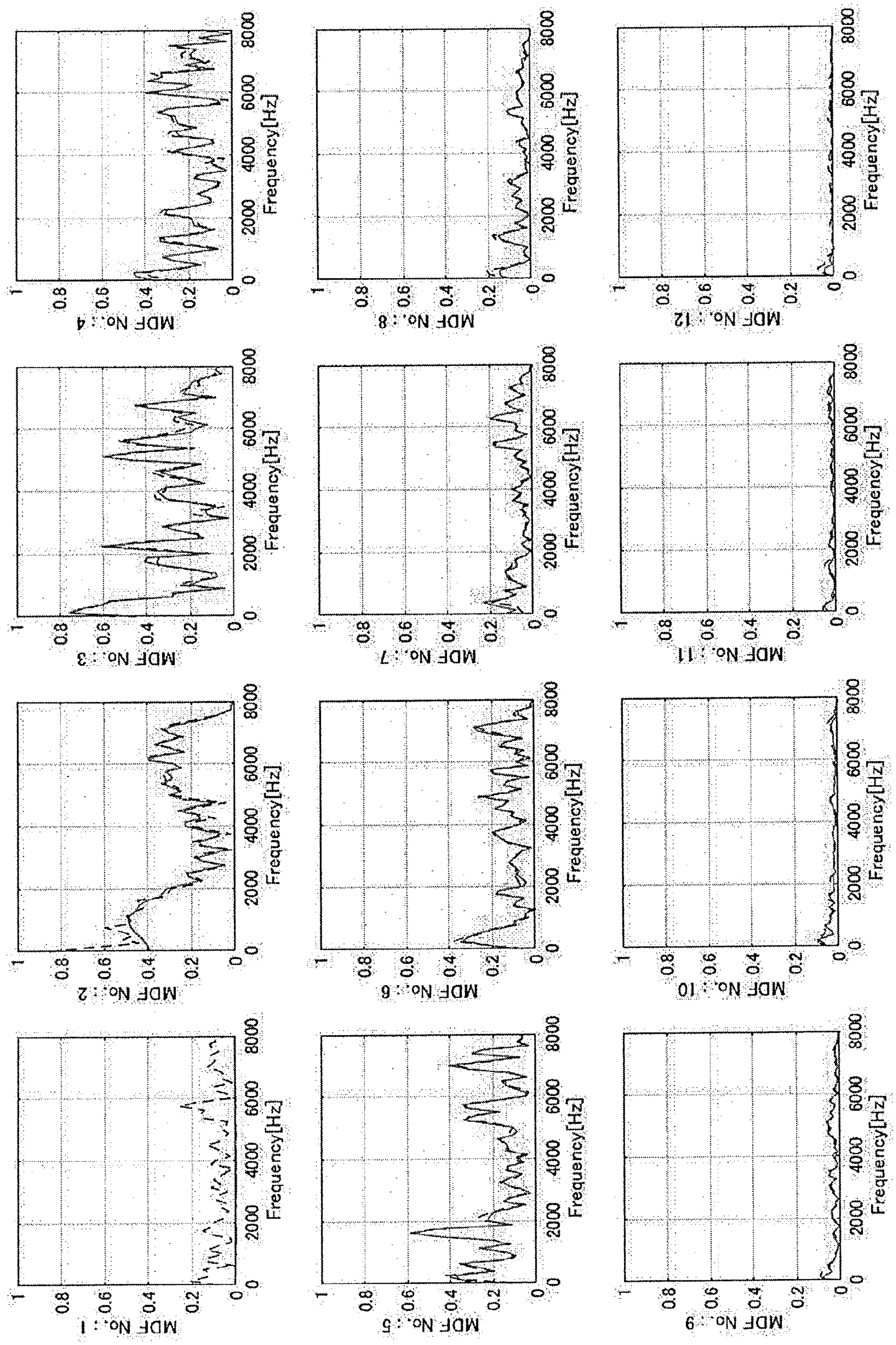
FIG. 4 includes graphs each showing an example of a filter coefficient estimated for each of a plurality of divisional blocks in an MDF adaptive filter, and a measured acoustic feedback characteristic.

FIG. 4 includes graphs each showing an example of a filter coefficient estimated for each of a plurality of divisional blocks in the MDF adaptive filter, and a measured acoustic feedback characteristic.

A filter coefficient estimated for each of a first divisional block to a twelfth divisional block and a measured acoustic feedback characteristic are shown from an upper-left position to a lower-right position in FIG. 4. The horizontal axis indicates a frequency, and the vertical axis indicates an absolute value of each of the filter coefficient and the acoustic feedback characteristic. A dashed line indicates absolute values |W'1|, and |W'12| of the filter coefficients estimated for the respective divisional blocks. A solid line indicates absolute values |W1|, . . . , and |W12| of acoustic feedback characteristics of acoustic feedback reaching the microphone 1 from the speaker 3, the absolute values being premeasured respectively in the divisional blocks.

The estimator 102 calculates a total value ΣW' of the absolute values |W'|, . . . , and |W'12| of the filter coefficients estimated respectively for the divisional blocks in the adaptive filter 101.

Although the estimator 102 calculates the total value of the absolute values of all the filter coefficients estimated respectively for the divisional blocks in the adaptive filter 101 in the embodiment, this disclosure is not particularly limited thereto, and the estimator may calculate a total value of absolute values of a part of the filter coefficients estimated respectively for the divisional blocks in the adaptive filter 101. For instance, as shown in FIG. 4, the filter coefficient for each of the ninth to twelfth divisional blocks is smaller than 0.1, and a contribution rate to the acoustic feedback sound is low. The estimator 102 thus may calculate a total value of absolute values of the filter coefficients estimated for the first to eighth divisional blocks without using the filter coefficients estimated for the ninth to twelfth divisional blocks.

Figure 5:
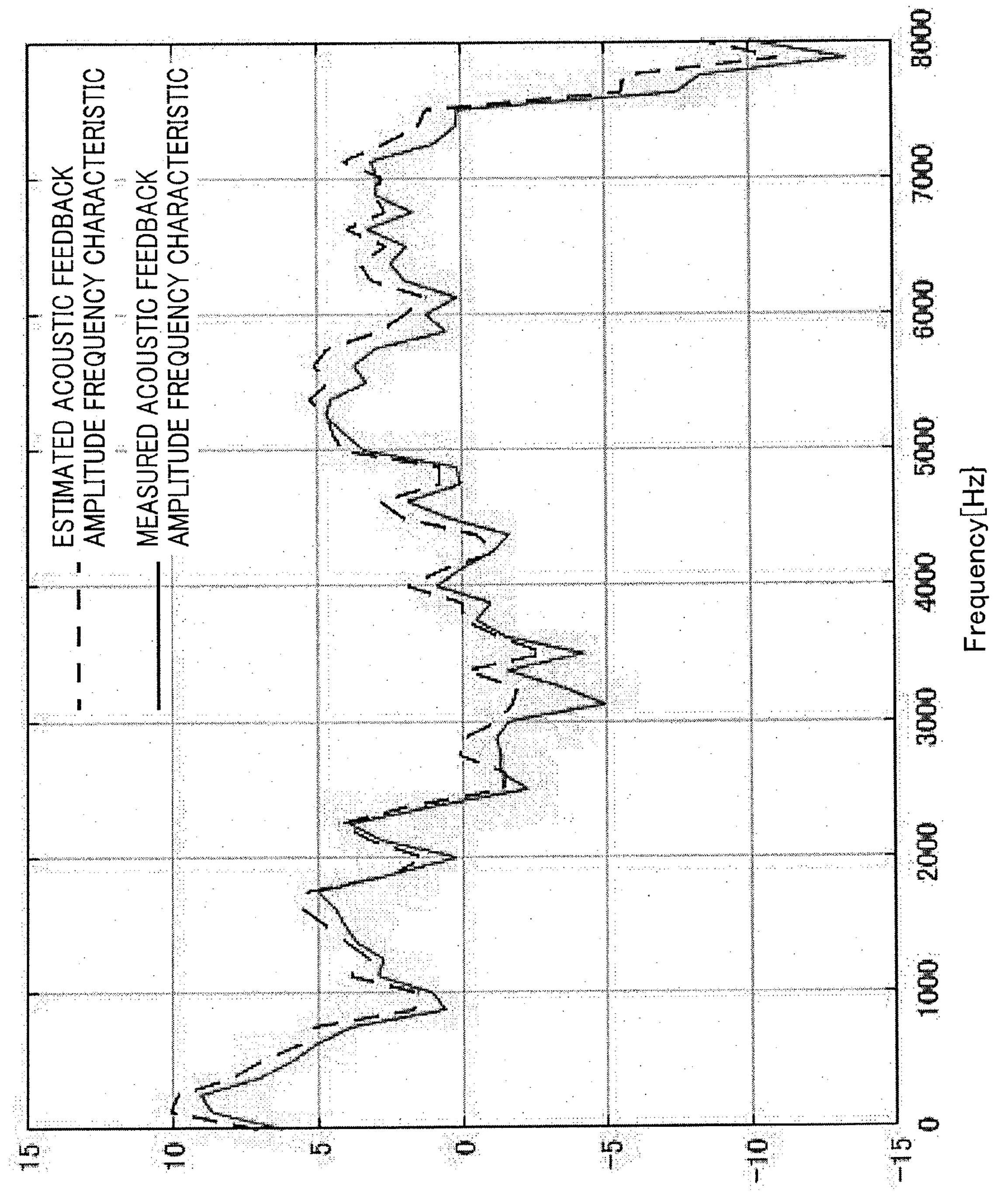
FIG. 5 is a graph showing an example of an acoustic feedback amplitude frequency characteristic estimated by an estimator, and a measured acoustic feedback amplitude frequency characteristic.

FIG. 5 is a graph showing an example of an acoustic feedback amplitude frequency characteristic estimated by the estimator 102, and a measured acoustic feedback amplitude frequency characteristic. The horizontal axis indicates a frequency, and the vertical axis indicates an acoustic feedback amplitude frequency characteristic. A dashed line indicates an acoustic feedback amplitude frequency characteristic estimated by the estimator 102, i.e., a total value ΣW' of absolute values of filter coefficients respectively for the divisional blocks in the MDF adaptive filter. A solid line indicates a premeasured acoustic feedback amplitude frequency characteristic |W|. As shown in FIG. 5, the total value ΣW' of the absolute values W'1, . . . , and W'12 for the respective divisional blocks in the MDF adaptive filter substantially agrees with the premeasured acoustic feedback amplitude frequency characteristic |W|.

Figure 6:
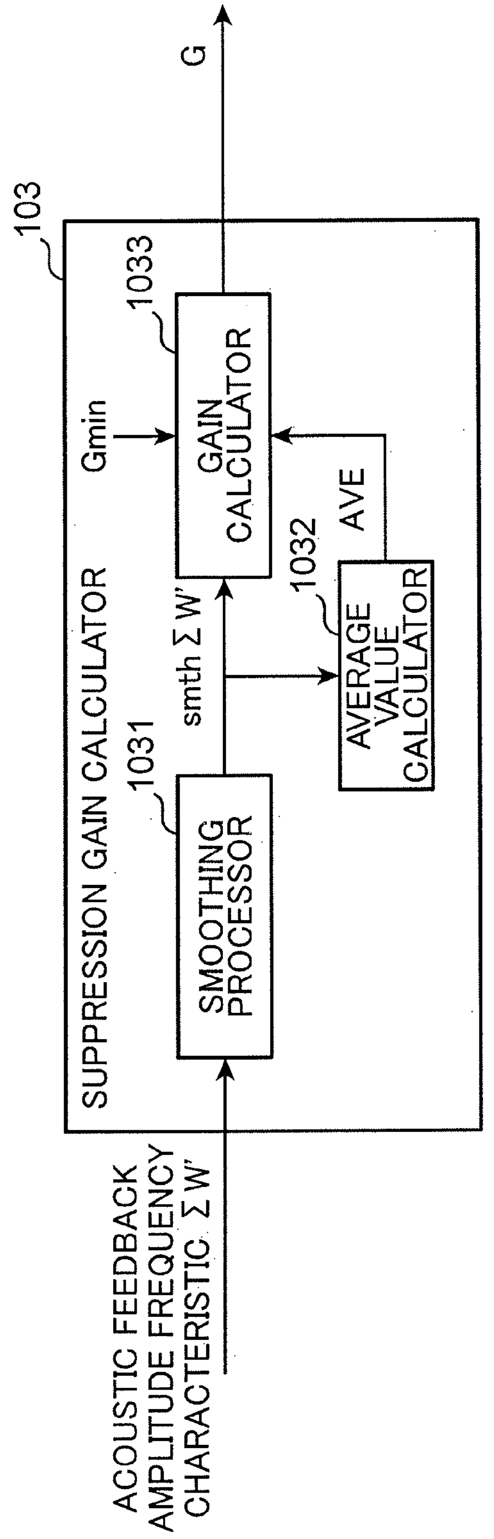
FIG. 6 is a block diagram showing a configuration of a suppression gain calculator in FIG. 2 in detail.

FIG. 6 is a block diagram showing a configuration of the suppression gain calculator 103 in FIG. 2 in detail.

The suppression gain calculator 103 calculates a suppression gain G from the acoustic feedback amplitude frequency characteristic estimated by the estimator 102, i.e., from the total value ΣW' of the filter coefficients.

The suppression gain calculator 103 includes a smoothing processor 1031, an average value calculator 1032, and a gain calculator 1033.

The smoothing processor 1031 calculates a smoothing value smth ΣW' obtained by smoothing the acoustic feedback amplitude frequency characteristic input thereto, i.e., smoothing the total value ΣW' of the absolute values of the filter coefficients, in a time direction.

The smoothing processor 1031 calculates the smoothing value smth ΣW' of the input acoustic feedback amplitude frequency characteristic, i.e., the total value ΣW' of the absolute values of the filter coefficients. When the total value ΣW'(i) is smaller than the smoothing value smth ΣW'(i), i.e., smth ΣW' (i)>ΣW'(i), the smoothing processor 1031 executes the smoothing per frequency component in accordance with Equation (2) shown below.

$$\text{smth } \Sigma W'(i)=(1-\alpha dn)*\text{smth } \Sigma W'(i)+\alpha dn*(i) \quad (2)$$

When the total value ΣW'(1) is equal to or larger than the smoothing value smth ΣW'(i), i.e., smth ΣW'(i)≤ΣW'(i), the smoothing processor 1031 executes the smoothing per frequency component in accordance with Equation (3) shown below.

$$\text{smth } \Sigma W'(i)=(1-\alpha up)*\text{smth } \Sigma W'(i)+\alpha up*\Sigma W'(i) \quad (3)$$

In Equation (2) and Equation (3), the sign "i" denotes the number of frequency components (i=0, 1, 2, . . . , FFT point −1), and the sign "αup" denotes a rising weight coefficient, and the sign "αdn" denotes a falling weight coefficient, and the coefficient "αup" is larger than the coefficient "αdn", i.e., αup>αdn.

The smoothing value smth ΣW' changes rapider in the case of ΣW' larger than smth ΣW' than in the case of ΣW' smaller than smth ΣW'. Such rapider change allows the smoothing to serve as peak holding.

The average value calculator 1032 calculates an average value AVE of all the frequencies of smoothing values smth ΣW' calculated by the smoothing processor 1031.

Figure 7:
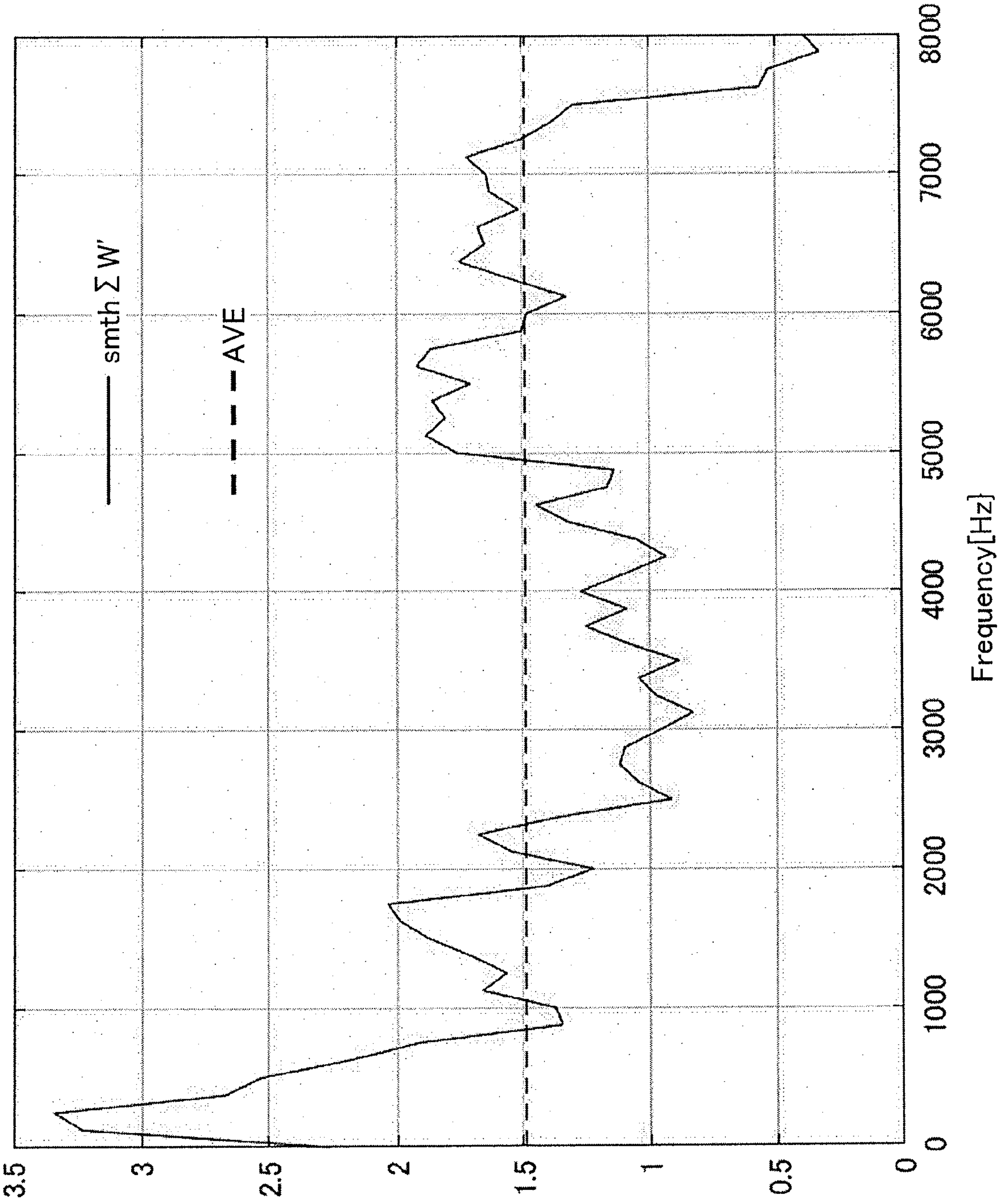
FIG. 7 is a graph showing an example of a smoothing value smth $\Sigma W'$ calculated by a smoothing processor and an average value AVE calculated by an average value calculator.

FIG. 7 is a graph showing an example of the smoothing value smth ΣW' calculated by the smoothing processor 1031 and an average value AVE calculated by the average value calculator 1032.

As shown in FIG. 7, the smoothing value smth ΣW' is obtained by smoothing the total value ΣW', and the average value AVE of all the frequencies of the smoothing values smth ΣW' is, for example, 1.5.

The gain calculator 1033 divides the average value AVE of all the frequencies calculated by the average value calculator 1032 by the smoothing value smth DV, and clips a maximum value of a division result at an upper limit value Gmax and clips a minimum value of the division result at a lower limit value Gmin to calculate a suppression gain G. The upper limit value Gmax indicates, for example, one, and the lower limit value Gmin falls within, for example, a range of ½ to ¼.

Figure 8:
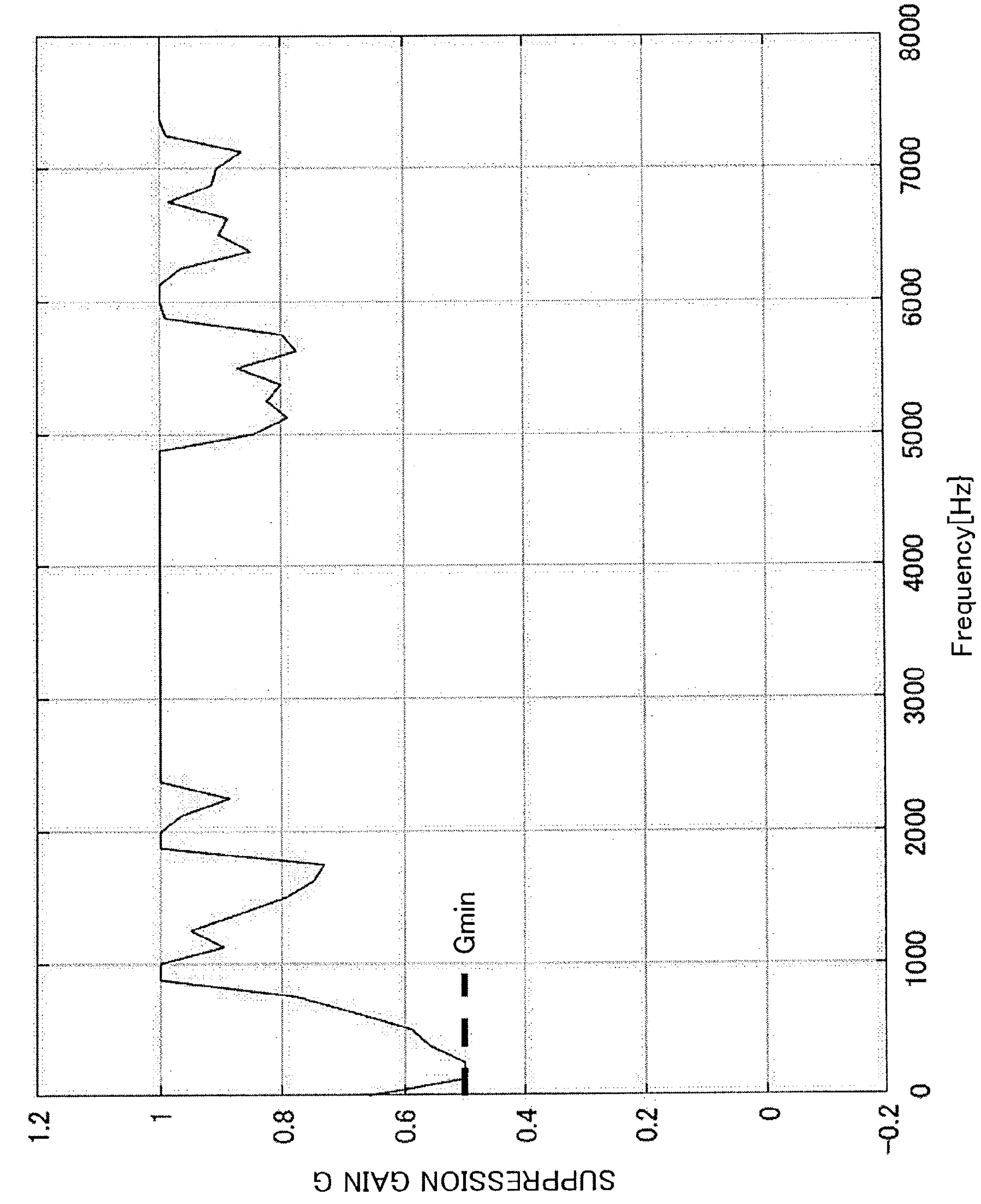
FIG. 8 is a graph showing an example of a suppression gain G calculated by a gain calculator.

FIG. 8 is a graph showing an example of the suppression gain G calculated by the gain calculator 1033.

The suppression gain G calculated by the gain calculator 1033 results in Gmin≤G≤1. The lower limit value Gmin shown in FIG. 8 is, for example, 0.5. The reason for clipping the minimum value of the suppression gain G at the lower limit value Gmin is to prevent a sound quality deterioration attributed to significant suppression of a sound of an utterer contained in an output from the adaptive filter 101.

Figure 9:
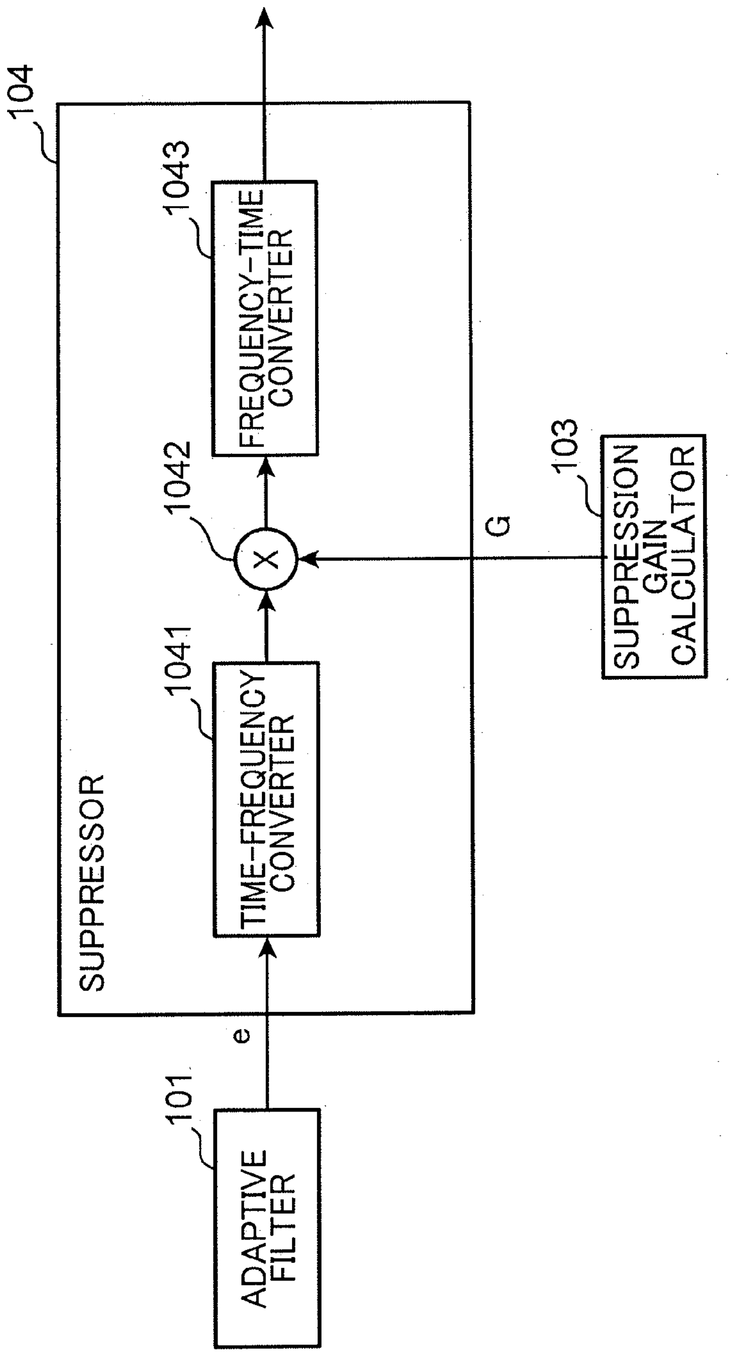
FIG. 9 is a block diagram showing a configuration of a suppressor in FIG. 2 in detail.

FIG. 9 is a block diagram showing a configuration of the suppressor 104 in FIG. 2 in detail.

The suppressor 104 includes a time-frequency converter 1041, a multiplier 1042, and a frequency-time converter 1043.

The time-frequency converter 1041 converts an output signal in the time domain output by the adaptive filter 101 into an output signal in the frequency domain.

The multiplier 1042 multiplies the converted output signal in the frequency domain by a suppression gain calculated by the suppression gain calculator 103.

The frequency-time converter 1043 converts an output signal in the frequency domain resulting from the multiplication of the suppression gain by the multiplier 1042 into an output signal in the time domain. This configuration achieves suppression of a peak component of an acoustic feedback characteristic in the frequency domain.

The time-frequency converter 1041 may perform the fast Fourier transform, and the frequency-time converter 1043 may perform the inverse fast Fourier transform. In adoption of an MDF adaptive filter for the adaptive filter 101, the FFT point number for each of the time-frequency converter 1041 and the frequency-time converter 1043 is preferably same as the FFT point number used for the MDF adaptive filter. In this way, the frequency component number of the output signal from the time-frequency converter 1041 equals to the frequency component number of the suppression gain, and the computation or calculation is facilitated.

In adoption of the MDF adaptive filter for the adaptive filter 101, the first to $N^{-th}$ frequency domain adaptive filters 431 to 43N can individually set filter update gains respectively for the divisional blocks.

Figure 10:
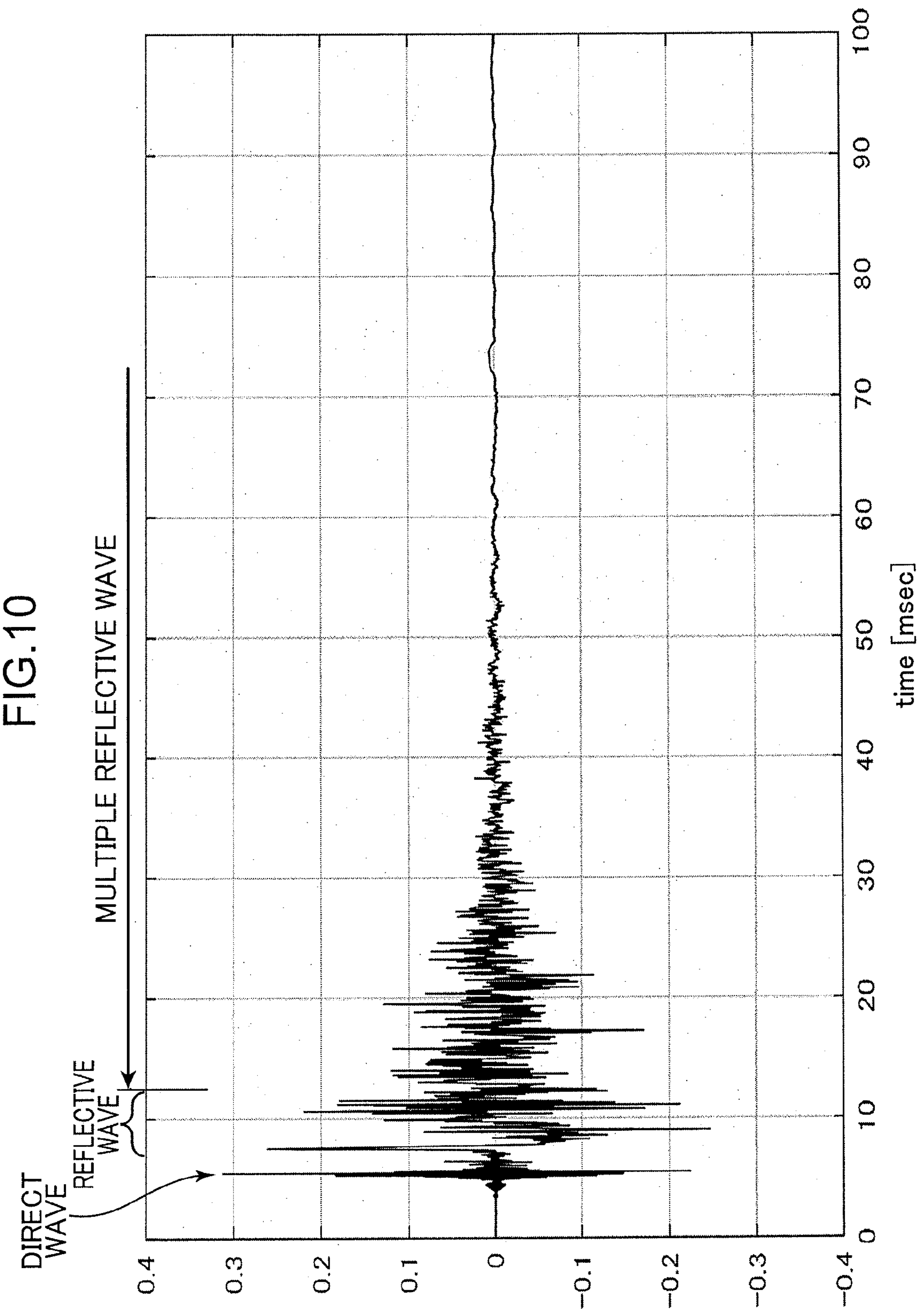
FIG. 10 is a graph showing an example of an acoustic feedback characteristic or a time impulse response.

FIG. 10 is a graph showing an example of an acoustic feedback characteristic or a time impulse response.

As shown in FIG. 10, the acoustic feedback characteristic includes a direct wave, a reflective wave, and a multiple reflective wave. The direct wave is firstly output, and thereafter, the reflective wave and the multiple reflective wave are output. Thus, the acoustic feedback characteristic reduces in accordance with a time lapse. The first to $N^{-th}$ frequency domain adaptive filters 431 to 43N may set the filter update gains to gradually decrease in a chronological order for the divisional blocks in response to a gradual decrease in the acoustic feedback characteristics along with an increase in the divisional block number. The filter update gain or coefficient update gain of a coefficient update algorithm for each of the divisional blocks may decrease as a delay is longer. The setting of each filter update gain in this manner leads to an improvement in the convergence speed of the adaptive filter.

Although the coefficient update algorithm or adaptive algorithm for each of the first to $N^{-th}$ frequency domain adaptive filters 431 to 43N includes the normalized LMS in the embodiment, the present disclosure is not particularly limited thereto. The coefficient update algorithm may include the LMS, an independent component analysis, an affine projection way, a recursive least squares (RLS) method, or other algorithm. Setting of a filter update gain in any of these algorithms in the same manner as the normalized LMS attains an improvement in the convergence speed as well.

The adaptive filter 101 may further estimate an acoustic feedback characteristic in a time domain rather than an acoustic feedback characteristic in a frequency domain. In this case, the estimator 102 may convert the acoustic feedback characteristic in the time domain estimated by the adaptive filter 101 into the acoustic feedback characteristic in the frequency domain to estimate an acoustic feedback amplitude frequency characteristic in the frequency domain. Specifically, when the adaptive filter 101 includes a time domain adaptive filter, the estimator 102 may convert a filter coefficient in the time domain into a filter coefficient in the frequency domain, and may estimate a total value Σ|W'| of filter coefficients in the frequency domain after the conversion as an acoustic feedback amplitude frequency characteristic.

Subsequently, an operation by the howling suppressing device 100 according to the embodiment of the disclosure will be described.

Figure 11:
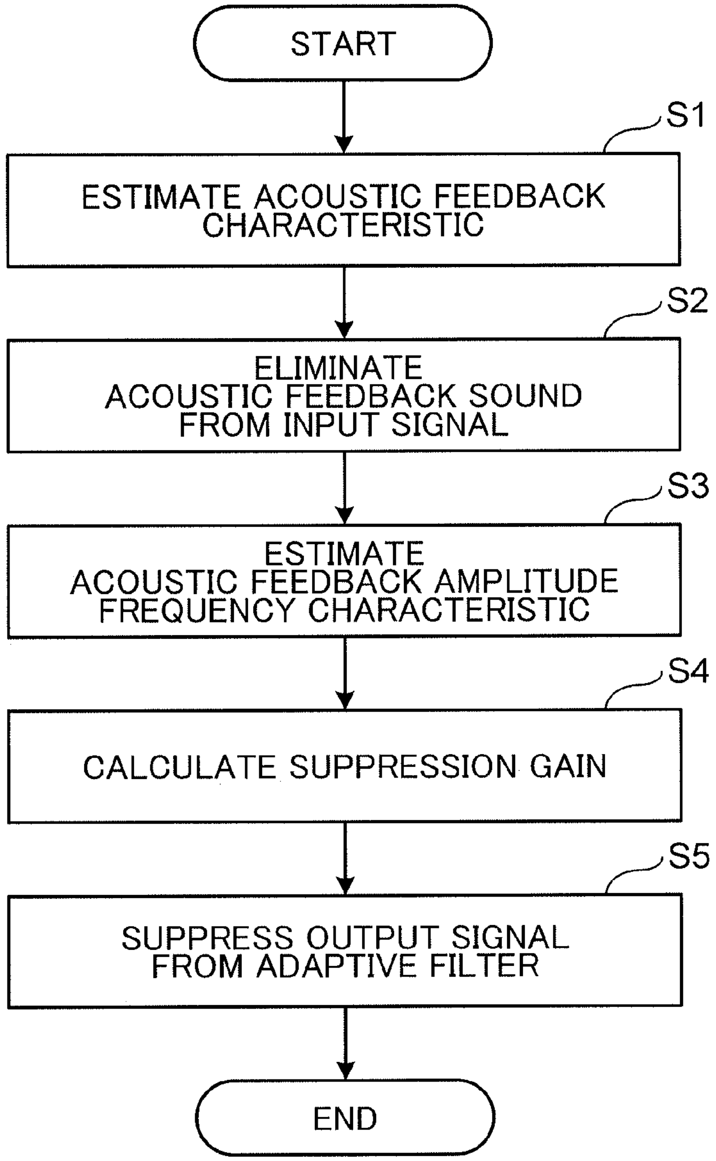
FIG. 11 is a flowchart explaining an operation by the howling suppressing device according to the embodiment of the disclosure.

FIG. 11 is a flowchart explaining the operation by the howling suppressing device 100 according to the embodiment of the disclosure.

First, in step S1, the adaptive filter 101 estimates an acoustic feedback characteristic representing a characteristic of an acoustic feedback sound reaching the microphone 1 from the speaker 3 by defining an output signal to the speaker 3 as a reference signal.

Next, in step S2, the adaptive filter 101 eliminates the acoustic feedback sound from an input signal obtained via the microphone 1 by using the estimated acoustic feedback characteristic.

Subsequently, in step S3, the estimator 102 estimates, on the basis of the acoustic feedback characteristic estimated by the adaptive filter 101, an acoustic feedback amplitude frequency characteristic in a frequency domain.

Then, in step S4, the suppression gain calculator 103 calculates, from the acoustic feedback amplitude frequency characteristic estimated by the estimator 102, a suppression gain in the frequency domain for smoothing a frequency peak of the acoustic feedback amplitude frequency characteristic.

Thereafter, in step S5, the suppressor 104 suppresses an output signal from the adaptive filter 101 in the frequency domain by using the suppression gain calculated by the suppression gain calculator 103.

In this manner, the adaptive filter 101 eliminates the acoustic feedback sound reaching the microphone 1 from the speaker 3, and the suppressor 104 suppresses a frequency peak component of the acoustic feedback amplitude frequency characteristic, and thus, stable suppression of howling is achieved.

In the embodiments, each constituent element may be realized with dedicated hardware or by executing a software program suitable for the constituent element. Each constituent element may be realized by a program execution unit, such as a CPU or a processor, reading out and executing a software program recorded on a recording medium, such as a hard disk or a semiconductor memory. Other independent computer system may implement a program by recording the program in a recording medium to be transferred, or transferring the program via a network.

A part or all of functions of the device according to the embodiment of the disclosure are typically realized as a large scale integration (LSI), which is an integrated circuit. These functions may be formed as separate chips, or some or all of the functions may be included in one chip. The circuit integration is not limited to the LSI, and may be realized with a dedicated circuit or a general-purpose processor. A field programmable gate array (FPGA) that is programmable after manufacturing of an LSI or a reconfigurable processor in which connections and settings of circuit cells within the LSI are reconfigurable may be used.

A part or all of functions of the device according to the embodiment of the present disclosure may be implemented by a processor, such as a CPU executing a program.

Numerical values used above are merely illustrative to be used to specifically describe the present disclosure, and thus the present disclosure is not limited to the illustrative numerical values.

Order in which steps shown in the flowcharts are executed is merely illustrative to be used to specifically describe the present disclosure, and thus steps may be executed in order other than the above order as long as similar effects are obtained. Some of the steps may be executed simultaneously (in parallel) with other steps.

INDUSTRIAL APPLICABILITY

The technology according to the present disclosure enables stable suppression of howling, and thus is useful as a technology for suppressing howling attributed to acoustic feedback from a speaker to a microphone.

The invention claimed is:

1. A howling suppressing device that suppresses howling attributed to acoustic feedback from a speaker provided in the same space as a microphone to the microphone when the speaker produces a sound of sufficient amplitude to produce the acoustic feedback generating the howling acquired by the microphone, the howling suppressing device comprising:

an adaptive filter that estimates an acoustic feedback characteristic representing a characteristic of an acoustic feedback sound reaching the microphone from the speaker by defining an output signal to the speaker as a reference signal, and eliminates the acoustic feedback sound from an input signal obtained via the microphone by using the estimated acoustic feedback characteristic;

an estimator that estimates, on the basis of the estimated acoustic feedback characteristic, an acoustic feedback amplitude frequency characteristic in a frequency domain;

a suppression gain calculator that calculates, from the estimated acoustic feedback amplitude frequency characteristic, a suppression gain in the frequency domain for smoothing a frequency peak of the acoustic feedback amplitude frequency characteristic; and a suppressor that suppresses an output signal from the adaptive filter in the frequency domain by using the calculated suppression gain, wherein the adaptive filter includes a frequency domain adaptive filter that estimates the acoustic feedback characteristic in each of a plurality of divisional blocks, a coefficient update algorithm for each of the divisional blocks includes a normalized least mean square or an independent component analysis, and the coefficient update algorithm for each of the divisional blocks has a coefficient update gain that decreases as a delay increases.

2. The howling suppressing device according to claim 1, wherein the acoustic feedback characteristic includes a filter coefficient of the frequency domain adaptive filter, and the estimator calculates a total value of a plurality of filter coefficients estimated respectively for the divisional blocks, and estimates the calculated total value as the acoustic feedback amplitude frequency characteristic.

3. The howling suppressing device according to claim 2, wherein the suppression gain calculator calculates the suppression gain by dividing an average value of acoustic feedback amplitude frequency characteristics estimated by the estimator by each acoustic feedback amplitude frequency characteristic.

4. The howling suppressing device according to claim 3, wherein the suppression gain calculator limits a maximum value of the suppression gain.

5. The howling suppressing device according to claim 3, wherein the suppression gain calculator limits a minimum value of the suppression gain.

6. The howling suppressing device according to claim 1, wherein the estimator is configured to convert an acoustic feedback characteristic in a time domain estimated by the adaptive filter into the acoustic feedback characteristic in the frequency domain, and estimates the acoustic feedback amplitude frequency characteristic in the frequency domain.

7. A howling suppressing method for a howling suppressing device that suppresses howling attributed to acoustic feedback from a speaker provided in the same space as a microphone to the microphone when the speaker produces a sound of sufficient amplitude to produce the acoustic feedback generating the howling acquired by the microphone, the howling method comprising:

causing an adaptive filter to estimate an acoustic feedback characteristic representing a characteristic of an acoustic feedback sound reaching the microphone from the speaker by defining an output signal to the speaker as a reference signal, and eliminate the acoustic feedback sound from an input signal obtained via the microphone by using the estimated acoustic feedback characteristic;

causing an estimator to estimate, on the basis of the estimated acoustic feedback characteristic, an acoustic feedback amplitude frequency characteristic in a frequency domain;

causing a suppression gain calculator to calculate, from the estimated acoustic feedback amplitude frequency characteristic, a suppression gain in the frequency domain for smoothing a frequency peak of the acoustic feedback amplitude frequency characteristic; and causing a suppressor to suppress an output signal from the adaptive filter in the frequency domain by using the calculated suppression gain, wherein the adaptive filter includes a frequency domain adaptive filter that estimates the acoustic feedback characteristic in each of a plurality of divisional blocks, a coefficient update algorithm for each of the divisional blocks includes a normalized least mean square or an independent component analysis, and the coefficient update algorithm for each of the divisional blocks has a coefficient update gain that decreases as a delay increases.

8. A non-transitory computer readable recording medium storing a howling suppressing program for suppressing howling attributed to acoustic feedback from a speaker provided in the same space as a microphone to the microphone when the speaker produces a sound of sufficient amplitude to produce the acoustic feedback generating the howling acquired by the microphone, the howling suppressing program comprising: causing a computer to serve as:

an adaptive filter that estimates an acoustic feedback characteristic representing a characteristic of an acoustic feedback sound reaching the microphone from the speaker by defining an output signal to the speaker as a reference signal, and eliminates the acoustic feedback sound from an input signal obtained via the microphone by using the estimated acoustic feedback characteristic;

an estimator that estimates, on the basis of the estimated acoustic feedback characteristic, an acoustic feedback amplitude frequency characteristic in a frequency domain;

a suppression gain calculator that calculates, from the estimated acoustic feedback amplitude frequency characteristic, a suppression gain in the frequency domain for smoothing a frequency peak of the acoustic feedback amplitude frequency characteristic; and a suppressor that suppresses an output signal from the adaptive filter in the frequency domain by using the calculated suppression gain, wherein the adaptive filter includes a frequency domain adaptive filter that estimates the acoustic feedback characteristic in each of a plurality of divisional blocks, a coefficient update algorithm for each of the divisional blocks includes a normalized least mean square or an independent component analysis, and the coefficient update algorithm for each of the divisional blocks has a coefficient update gain that decreases as a delay increases.

9. A howling suppressing device that suppresses howling attributed to acoustic feedback from a speaker provided in the same space as a microphone to the microphone when the speaker produces a sound of sufficient amplitude to produce the acoustic feedback generating the howling acquired by the microphone, the howling suppressing device comprising:

an adaptive filter that estimates an acoustic feedback characteristic representing a characteristic of an acoustic feedback sound reaching the microphone from the speaker by defining an output signal to the speaker as a reference signal, and eliminates the acoustic feedback sound from an input signal obtained via the microphone by using the estimated acoustic feedback characteristic;

an estimator that estimates, on the basis of the estimated acoustic feedback characteristic, an acoustic feedback amplitude frequency characteristic in a frequency domain;

a suppression gain calculator that calculates, from the estimated acoustic feedback amplitude frequency characteristic, a suppression gain in the frequency domain for smoothing a frequency peak of the acoustic feedback amplitude frequency characteristic; and a suppressor that suppresses an output signal from the adaptive filter in the frequency domain by using the calculated suppression gain, wherein the adaptive filter includes a frequency domain adaptive filter that estimates the acoustic feedback characteristic in each of a plurality of divisional blocks, the acoustic feedback characteristic includes a filter coefficient of the frequency domain adaptive filter, the estimator calculates a total value of a plurality of filter coefficients estimated respectively for the divisional blocks, and estimates the calculated total value as the acoustic feedback amplitude frequency characteristic, and the suppression gain calculator calculates the suppression gain by dividing an average value of acoustic feedback amplitude frequency characteristics estimated by the estimator by each acoustic feedback amplitude frequency characteristic.

* * * * *